US012019224B2

(12) United States Patent
Huang et al.

(10) Patent No.: US 12,019,224 B2
(45) Date of Patent: Jun. 25, 2024

(54) EXTERNAL WIDE-ANGLE LENS FOR IMAGERS IN ELECTRONIC DEVICES

(71) Applicant: Google LLC, Mountain View, CA (US)

(72) Inventors: Shan Fu Huang, New Taipei (TW); Chen Cheng Lee, Taoyuan (TW); Tsung-Dar Cheng, Taipei (TW); Calvin Kyaw Wong, Cupertino, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/473,900

(22) Filed: Sep. 25, 2023

(65) Prior Publication Data

US 2024/0012227 A1    Jan. 11, 2024

Related U.S. Application Data

(60) Provisional application No. 63/584,394, filed on Sep. 21, 2023.

(51) Int. Cl.
*G02B 13/06* (2006.01)
*H04N 23/698* (2023.01)

(52) U.S. Cl.
CPC .......... *G02B 13/06* (2013.01); *H04N 23/698* (2023.01)

(58) Field of Classification Search
CPC .............................. G02B 13/06; H04N 23/698
See application file for complete search history.

(56) References Cited

U.S. PATENT DOCUMENTS

| 10,044,932 B2 * | 8/2018 | Martin | H04N 23/54 |
| 10,338,352 B2 * | 7/2019 | Yin | G02B 13/06 |
| 2009/0080093 A1 | 3/2009 | Ning | |

FOREIGN PATENT DOCUMENTS

| CN | 210142231 | 3/2020 |
| CN | 111580253 | 8/2020 |
| JP | 2008134535 | 6/2008 |

OTHER PUBLICATIONS

Etherington, Darrell, "MIT Engineers Develop a Totally Flat Fisheye Lens that Could make Wide-Angle Cameras Easier to Produce", Sep. 19, 2020, 8 pages.

* cited by examiner

*Primary Examiner* — Seung C Sohn
(74) *Attorney, Agent, or Firm* — Colby Nipper PLLC

(57) ABSTRACT

This document describes systems and techniques directed at an external wide-angle lens for imagers in electronic devices. An imager is disclosed that includes an image sensor and a lens stack, the lens stack including an external wide-angle lens, an internal lens, and four or more intermediate lenses. The imager has a first ratio of a projection at a vertex of the external wide-angle lens divided by a maximum focused dimension of the focal area being less than or equal to 0.15, a second ratio of a total length of the lens stack divided by the maximum focused dimension being less than or equal to 7.0, or a third ratio of a total transmission length of the imager divided by an entrance pupil diameter of the external wide-angle lens being between 1.2 and 2.6.

9 Claims, 4 Drawing Sheets

EXTERNAL WIDE-ANGLE LENS FOR IMAGERS IN ELECTRONIC DEVICES

CROSS-REFERENCE TO RELATED APPLICATION

This application claims priority to U.S. Provisional Patent Application Ser. No. 63/584,394 filed on Sep. 21, 2023, the disclosure of which is incorporated by reference herein in its entirety.

SUMMARY

This document describes systems and techniques directed at an external wide-angle lens for imagers in electronic devices. In aspects, an imager includes an image sensor configured to convert focused light into electrical signals, the focused light having a focal area on the image sensor and a lens stack, the lens stack configured to focus light of a scene onto the image sensor and having the focal area. The lens stack has an external wide-angle lens, and the external wide-angle lens has an arcuate external surface with a vertex projecting from a plane intersecting an external-most outer bound of an optical external bound of the external wide-angle lens, the arcuate external surface exposed to, and configured to receive the light of, the scene and permitting a field of view of 160 or more degrees. The lens stack also includes an internal lens, the internal lens disposed proximate to the image sensor, four or more intermediate lenses, the four or intermediate lenses disposed within the lens stack and between the external lens and the internal lens, and a total length measured from the vertex to the focal area on the image sensor. The imager has one or more of three ratios, a first ratio of the projection from the plane divided by a maximum focused dimension of the focal area on the image sensor being less than or equal to 0.15, a second ratio of the total length of the lens stack divided by the maximum focused dimension of the focal area on the image sensor being less than or equal to 7.0, and a third ratio of a total transmission length of the imager divided by an entrance pupil diameter of the external wide-angle lens being between 1.2 and 2.6.

This Summary is provided to introduce simplified concepts of systems and techniques directed at external wide-angle lenses for imagers in electronic devices, the concepts of which are further described below in the Detailed Description and Drawings. This Summary is not intended to identify essential features of the claimed subject matter, nor is it intended for use in determining the scope of the claimed subject matter.

BRIEF DESCRIPTION OF THE DRAWINGS

The details of one or more aspects of systems and techniques directed at external wide-angle lenses for imagers in electronic devices are described in this document with reference to the following.

The same numbers are used throughout the Drawings to reference like features and components.

DETAILED DESCRIPTION

Overview

Many electronic devices include imagers, such as multiple cameras and camera arrays. Users have come to expect small form-factor devices, such as thin mobile phones or small smart doorbells, while also expecting high imaging performance, such as wide-angle capture of scenes and high-resolution images.

To capture an image with both a comprehensive field of view and high image resolution, an imager includes multiple lenses, known as a lens stack. These imagers also have external-most lenses that are curved outward, which allows for a comprehensive field of view. These external-most lenses in wide-angle imagers, however, are prone to scratching by users because the external-most lens of the imager protrudes from the device. This problem also creates significant issues for manufacturers, which invest substantial resources to protect the imagers from aforementioned scratching.

To this end, this document describes systems and apparatuses directed at reducing one or both of a curvature and diameter of an external-most lens of a lens stack while simultaneously providing a same or larger field of view for captures. These systems and apparatuses allow for a wide-angle imager that is less prone to scratching and/or less costly to manufacture while permitting large fields of view and high resolution for the image captures.

Example Environment

Figure 1:
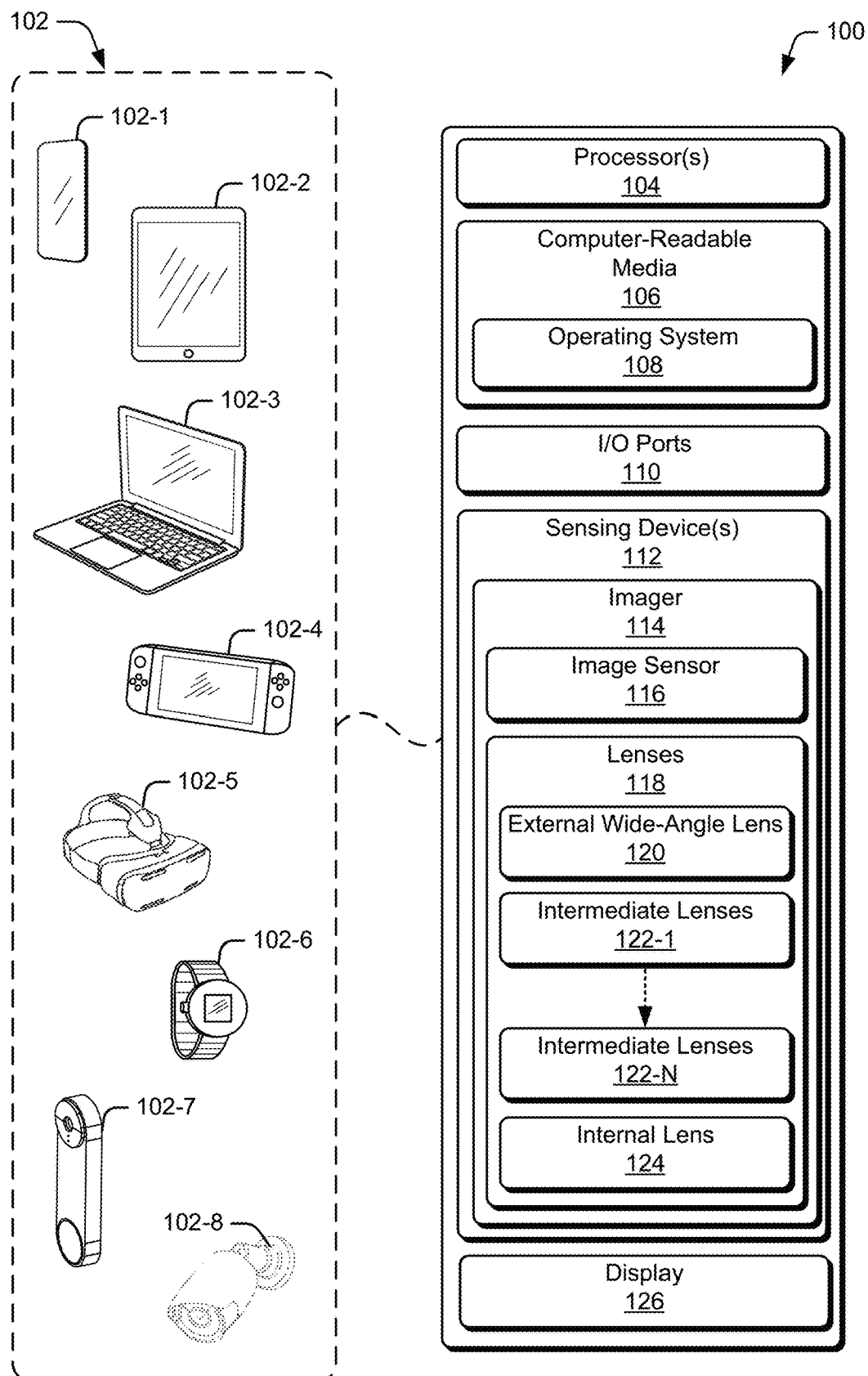
FIG. 1 illustrates an example device diagram of a electronic device in which an external wide-angle lens can be implemented.

FIG. 1 illustrates an example device diagram 100 of a electronic device 102 in which an external wide-angle lens can be implemented. The electronic device 102 may include additional components and interfaces omitted from FIG. 1 for the sake of clarity.

The electronic device 102 can be a variety of consumer electronic devices. As non-limiting examples, the electronic device 102 can be a mobile phone 102-1, a tablet device 102-2, a laptop computer 102-3, a portable video game console 102-4, virtual-reality (VR) goggles 102-5, a computerized watch 102-6, a smart doorbell 102-7, a security camera 102-8, and the like.

The electronic device 102 includes one or more processors 104. The processor(s) 104 can include, as non-limiting examples, a system on a chip (SoC), an application processor (AP), a central processing unit (CPU), or a graphics processing unit (GPU). The processor(s) 104 generally executes commands and processes utilized by the electronic device 102 and an operating system installed thereon. For example, the processor(s) 104 may perform operations to display images on the electronic device 102 and can perform other specific computational tasks.

The electronic device 102 also may include computer-readable storage media (CRM) 106 (in some cases the electronic device 102 communicates data, such as from a camera, to another device for processing, and therefore may not include CRM 106). The CRM 106 may be a suitable storage device configured to store device data of the electronic device 102, user data, and multimedia data. The CRM 106 may store an operating system 108 that generally manages hardware and software resources (e.g., applications) of the electronic device 102 and provides common services for applications stored on the CRM. The operating system 108 and the applications are generally executable by the processor(s) 104 to enable communications and user interaction with the electronic device 102. One or more processor(s) 104, such as a GPU, perform operations to display graphics of the electronic device 102 on a display 126 and can perform other specific computational tasks. The processor(s) 104 can be single-core or multiple-core processors. For example, processor-executable instructions stored on the CRM 106 may, on execution by the one or more processors 104, process electrical signals (which are a conversion of focused light) into an image of a scene. The image may then be displayed, transmitted, and/or stored (e.g., in the CRM 106).

The electronic device 102 may also include input/output (I/O) ports 110. The I/O ports 110 allow the electronic device 102 to interact with other devices or users. The I/O ports 110 may include any combination of internal or external ports, such as universal serial bus (USB) ports, audio ports, Serial ATA (SATA) ports, PCI-express based ports or card-slots, secure digital input/output (SDIO) slots, and/or other legacy ports.

The electronic device 102 further includes one or more sensing devices 112. The sensing devices 112 can include any of a variety of sensing devices, such as an audio sensing device (e.g., a microphone), a touch-input sensing device (e.g., a touchscreen or doorbell button), an imager 114 (e.g., an image-capture device, such as a camera, video-camera, camera array), proximity sensing devices (e.g., capacitive sensing devices), or an ambient light sensing device (e.g., photodetector). In implementations, the electronic device 102 includes one or more of a front-facing imager and/or a rear-facing imager, either or both of which may be configured with the external wide-angle lens described herein.

In more detail, the imager 114 of the electronic device 102 includes an image sensor 116 and lenses 118. The image sensor 116 is configured to convert focused light into electrical signals, the focused light being received through the lenses 118. The lenses 118 include an external wide-angle lens 120, four or more intermediate lenses 122-1 to 122-N, where N is an integer of four or more, and an internal lens 124.

Further, the electronic device 102 includes the display 126, which can be used to display images captured by the imager 114, act as a touch-sensitive device (e.g., a touchscreen or doorbell button), and so forth.

Figure 2:
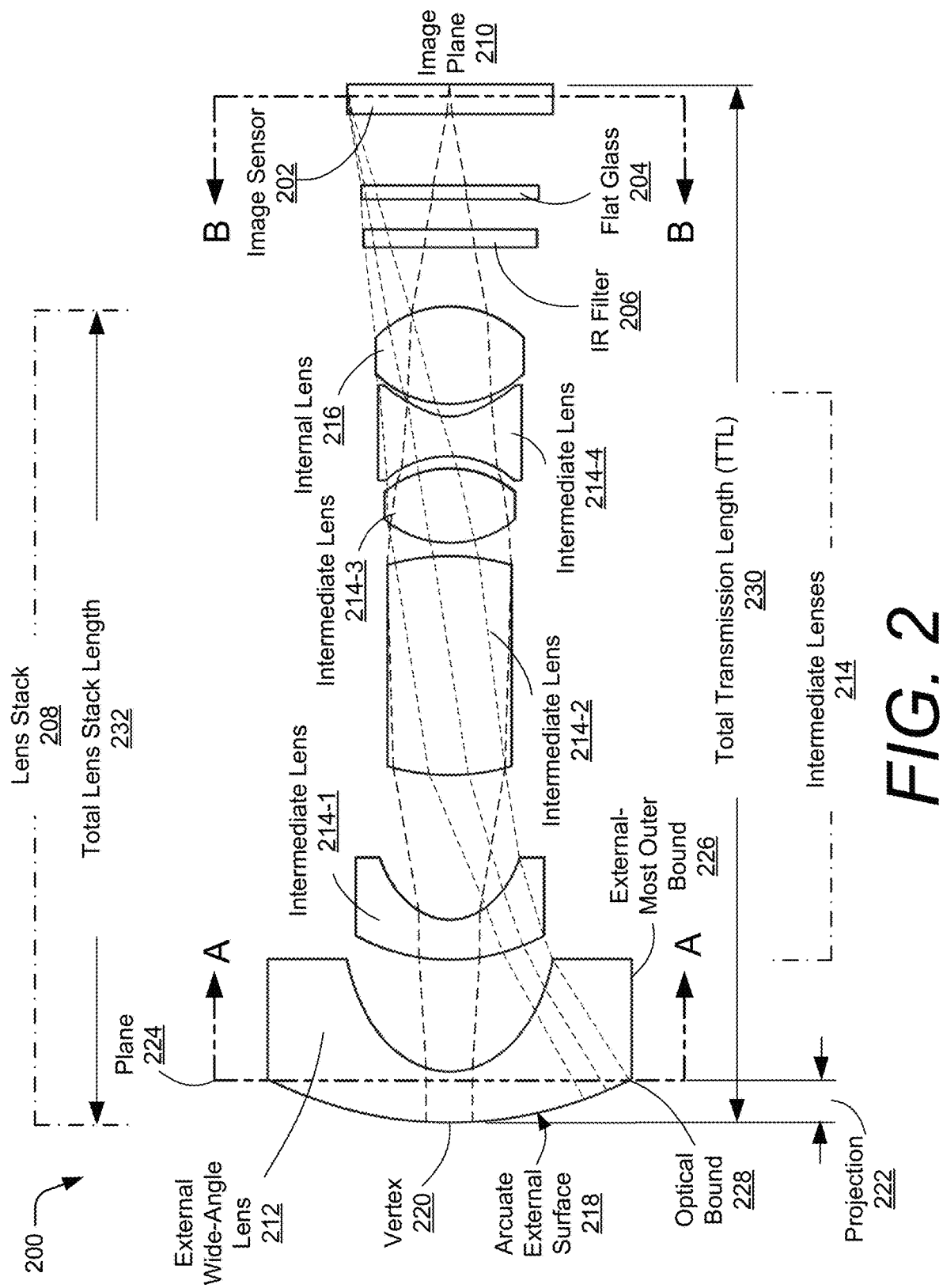
FIG. 2 illustrates an imager, which is an example implementation of an imager of FIG. 1 in which an external wide-angle lens can be implemented.

FIG. 2 illustrates an imager 200, which is an example implementation of the imager 114 of FIG. 1 in which an external wide-angle lens can be implemented. This imager 200 includes an image sensor 202, a flat glass 204, an infrared filter 206, and a lens stack 208. The image sensor 202 is configured to capture images through receiving and focusing light, which is then converted into electrical signals through the image sensor 202 and then processed into an image for storage, transmission, and/or display.

The lens stack 208 is configured to focus light of a scene (examples shown with dashed lines) onto the image sensor 202 on a focal area at an image plane 210. The lens stack 208 includes six or more lenses, including an external wide-angle lens 212, four or more intermediate lenses 214 (shown as 214-1, 214-2, 214-3, and 214-4), and an internal lens 216 (examples of lenses 118 of FIG. 1). The intermediate lenses 214 are disposed within the lens stack 208 between the external wide-angle lens 212 and the internal lens 216. The internal lens 216 is disposed proximate the image sensor 202 (here with two intervening elements, the IR filter 206 and the flat glass 204).

As shown, the lens stack 208 represents each of the six or more lenses used to receive the light from the scene and focus, through the lenses and based on refractive indexes of the lenses and air gaps between the lenses, light on the focal area at the image plane 210. Additional details on the focal area are illustrated and described with respect to FIG. 3.

The external wide-angle lens 212 has an arcuate external surface 218 with a vertex 220 projecting at a projection 222 from a plane 224 (across A-A, cross-section shown in FIG. 3) intersecting an external-most outer bound 226 of an optical bound 228 of the external wide-angle lens 212. The arcuate external surface 218 is exposed to, and configured to receive the light of, the scene. A lesser arc, as is apparent from the illustration, reduces the projection 222, which is desired for the reasons noted herein. Further, note that the external-most outer bound 226 and the optical bound 228 may share a same location on a physical outer bound of the external wide-angle lens 212, although this is not required. The external wide-angle lens 212 permits a field of view of the scene that is 160 degrees or more, such as 160, 165, 170, 175, 180, 185, 190, 195, or even 200 or more degrees (in this example of FIG. 2, the external wide-angle lens 212 enables a field of view of about 180 degrees). FIG. 2 also illustrates an example total transmission length 230 (TTL) of the imager 114, here measured from the vertex 220 to the focal area at the image plane 210 of the image sensor 202.

Figure 3:
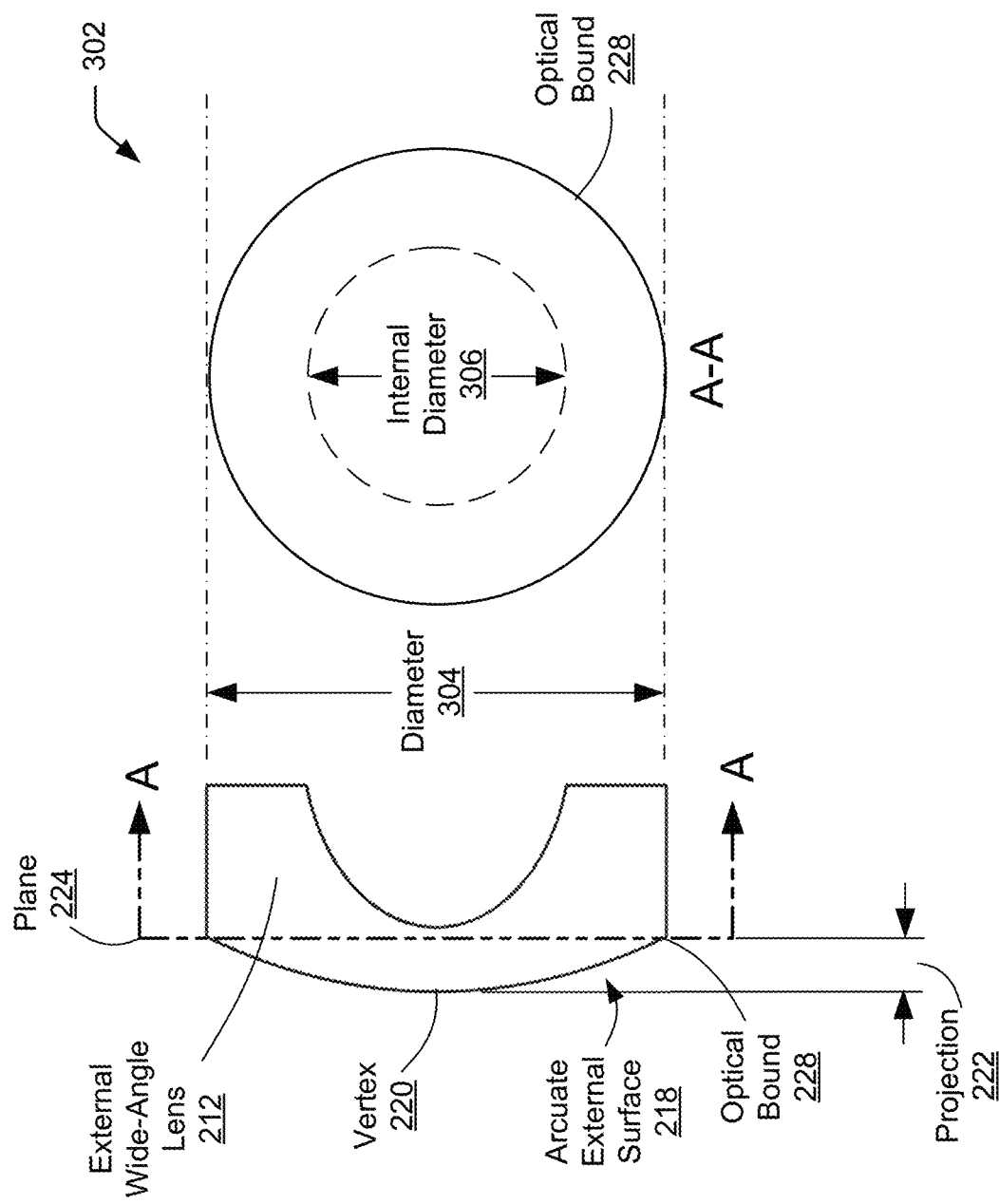
FIG. 3 illustrates the external wide-angle lens of FIG. 2 along with a cross-sectional view of the external wide-angle lens.

FIG. 3 illustrates the external wide-angle lens 212 of FIG. 2 along with a cross-sectional view 302 across A-A of the external wide-angle lens 212. This cross-sectional view 302 shows a diameter 304 of the external wide-angle lens 212, as well as an internal diameter 306.

Figure 4:
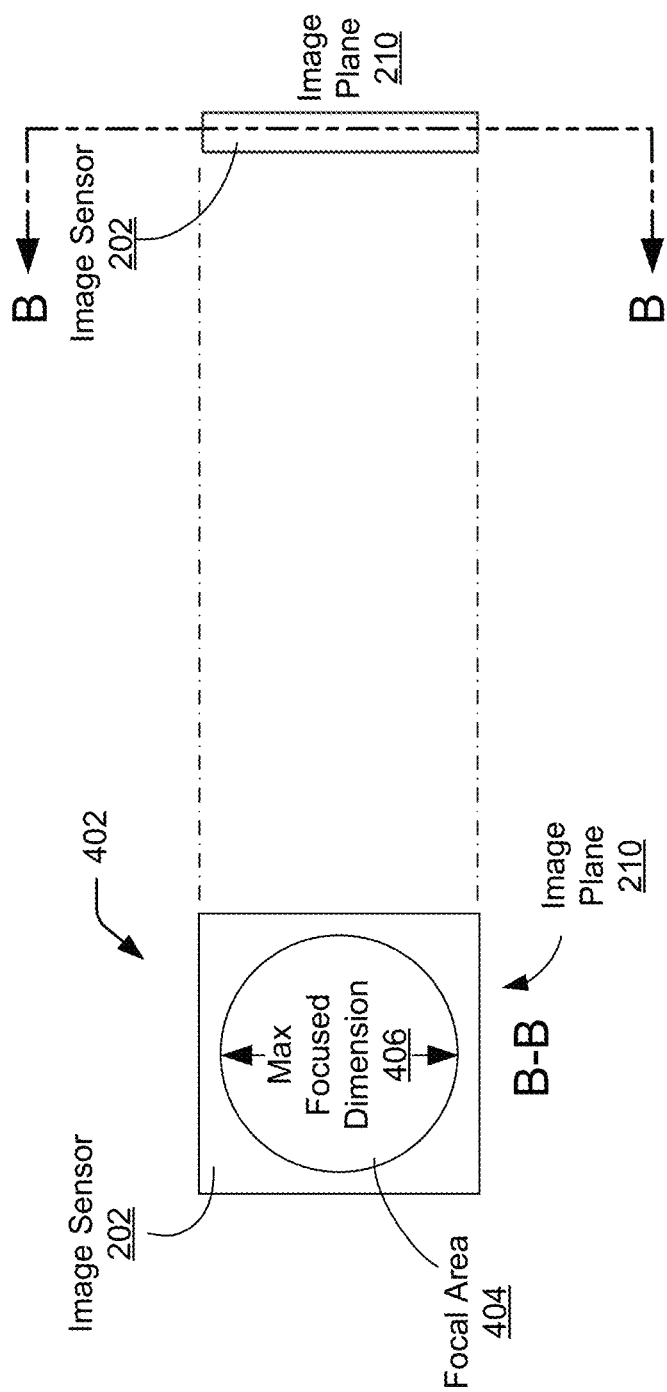
FIG. 4 illustrates an image plane of the image sensor of FIG. 2 along with a cross-sectional view.

FIG. 4 illustrates the image plane 210 of the image sensor 202 of FIG. 2 along with a cross-sectional view 402 across B-B in FIG. 2 (the image plane 210 is rotated 90 degrees at 402). The cross-sectional view 402 also illustrates a focal area 404, which is often circular or elliptical (but is not required to be). A maximum focused dimension 406 is also shown, which is here a diameter of a circular focus of a scene. This maximum focused dimension 406 can be a square root of the area of the focus or a maximum dimension; in cases where the area of the focus is not exactly circular the square root may not be exactly proportional to the maximum dimension.

Based at least in part on the configuration of the external wide-angle lens 212, the imager 114 has one or more of a first, second, or third ratio. The first ratio is of the projection 222, as seen in FIGS. 2 and 3, divided by a maximum focused dimension of the focal area (shown in FIG. 4) on the image sensor 202. In this example, the first ratio is less than or equal to 0.15. In some cases, however, this ratio is less than 0.12 or 0.10. Thus, a projection of a vertex of an external wide-angle lens may be reduced while enabling a same or larger focal area, thereby permitting both wide-angle image capture and a high-resolution image. As noted above, this projection is often exposed to an environment and is therefore subject to damage, which is likely to be reduced or lessened by reducing the projection of the vertex (e.g., the projection 222 of FIGS. 2 and 3).

The second ratio is of a total length of the lens stack 208, shown at total lens stack length 232 in FIG. 2, divided by the maximum focused dimension 406 of the focal area 404 on the image sensor 202, shown in FIGS. 2 and 4. This second ratio is less than or equal to 7.0 in this example. In some cases, however, the second ratio is less than 6.5 or 6.2. As noted above, a total length of the lens stack 208 affects a form factor, usability, and cost of a mobile computing device in which an imager is integrated (e.g., the imager 114 into the mobile phone 102-1). Using the described external wide-angle lens 212, a lens stack and thus form factor can be maintained or reduced in size while maintaining or improving a resolution of a captured image (e.g., based on a number of pixels on the image sensor 202 within the focal area as represented by the maximum focused dimension 406).

The third ratio is of the total transmission length 230 divided by an entrance pupil diameter (the diameter 304 of FIG. 3) of the external wide-angle lens 212 and is between 1.2 and 2.6. In some cases, however, the third ratio is between 1.4 and 2.4, or 1.6 and 2.2. This diameter 304, by being smaller, reduces costs and space for the imager 114 or, by being of similar size to many conventional wide-angle lenses, permits a reduced total transmission length 230, thereby again permitting a better form factor, reduced cost, and/or greater or maintained high resolution.

Returning to FIG. 2, the external wide-angle lens 212, the intermediate lenses 214, namely first intermediate lens 214-1, second intermediate lens 214-2, third intermediate lens 214-3, and fourth intermediate lens 214-4, along with the internal lens 216 are illustrated. As illustrated, various example focal lengths, refractive indexes, and ratios are contemplated. These are by way of example only, and are shown in Table 1 below.

TABLE 1

Focal Lengths, Refractive Indexes, and Ranges f: focal length of the assembly lens (TTL 230)
f1: focal length of the wide-angle lens 212
f2: focal length of the intermediate lens 214-1
f3: focal length of the intermediate lens 214-2
f4: focal length of the intermediate lens 214-3
f5: focal length of the intermediate lens 214-4
f6: focal length of the internal lens 216
n1: refractive index of the wide-angle lens 212, which is negative
n2: refractive index of the intermediate lens 214-1, which is negative
n3: refractive index of the intermediate lens 214-2, which is positive
n4: refractive index of the intermediate lens 214-3, which is positive
n5: refractive index of the intermediate lens 214-4, which is negative
n6: refractive index of the internal lens 216, which is positive

| | |
|---|---|
| $0.70 < f1/f2 < 10$ | $0.65 < n1/n3 < 1.0$ |
| $-1.26 < f1/f3 < -0.80$ | $1.0 < n5/n4 < 1.3$ |
| $-0.80 < f5/f4 < -0.50$ | $1.0 < n5/n6 < 1.3$ |
| $-0.80 < f5/f6 < -0.50$ | $1.5 < n1 < 1.8$ |
| | $1.6 < n5 < 1.78$ |

In addition to these example focal lengths, refractive indexes, and ranges, a curvature at the arcuate external surface 218 of the external wide-angle lens 212 is here shown at between 1.3 and 2. The above details result in one or more of the described ratios being met, thereby enabling higher resolution, lower cost, a smaller form factor, and/or wide-angle image capture for the imager 114.

As noted in part above, the example lens and configuration are not required but are instead illustrative. For example, while not required, the image sensor 202 is illustrated with the flat glass 204 and the infrared filter 206. The infrared filter 206 filters undesirable radiation to reduce the radiation's impact on the image sensor 202.

What is claimed is:

1. An imager comprising:
    an image sensor configured to convert focused light into electrical signals, the focused light having a focal area on the image sensor; and
    a lens stack, the lens stack having a total length and configured to focus light of a scene onto the image sensor and having the focal area, the lens stack having:
        a external wide-angle lens, the external wide-angle lens:
            having an arcuate external surface with a vertex projecting from a plane intersecting an external-most outer bound of an optical external bound of the external wide-angle lens, the arcuate external surface exposed to, and configured to receive the light of, the scene; and
            permitting a field of view of 160 or more degrees;
        an internal lens, the internal lens disposed proximate to the image sensor;
        four or more intermediate lenses, the four or intermediate lenses disposed within the lens stack and between the external lens and the internal lens; and
    a total transmission length measured from the vertex to the focal area on the image sensor,
        the imager having one or more of a first, second, or third ratio:
            the first ratio defined by the projection from the plane divided by a maximum focused dimension of the focal area on the image sensor being less than or equal to 0.15;
            the second ratio defined by the total length of the lens stack divided by the maximum focused dimension of the focal area on the image sensor being less than or equal to 7.0; or
            the third ratio defined by the total transmission length of the imager divided by an entrance pupil diameter of the external wide-angle lens being between 1.2 and 2.6.

2. The imager of claim 1, wherein the imager has the first ratio.

3. The imager of claim 2, wherein the first ratio is less than or equal to 0.12.

4. The imager of claim 1, wherein the imager has the second ratio.

5. The imager of claim 4, wherein the second ratio is less than or equal to 6.5.

6. The imager of claim 1, wherein the imager has the third ratio.

7. The imager of claim 6, wherein the third ratio is between 1.4 and 2.4.

8. The imager of claim 1, wherein the field of view is between 175 and 185 degrees.

9. The imager of claim 1, wherein the imager includes two of the first, second, and third ratios.

* * * * *